United States Patent
Goebel et al.

(10) Patent No.: US 7,951,507 B2
(45) Date of Patent: May 31, 2011

(54) FLUID FLOW PATH FOR STAMPED BIPOLAR PLATE

(75) Inventors: Steven G Goebel, Victor, NY (US); Nafissa Haimad, Wiesbaden (DE)

(73) Assignee: GM Global Technology Operations LLC

(*) Notice: Subject to any disclaimer, the term of this patent is extended or adjusted under 35 U.S.C. 154(b) by 1220 days.

(21) Appl. No.: 10/926,748

(22) Filed: Aug. 26, 2004

(65) Prior Publication Data

US 2006/0046132 A1    Mar. 2, 2006

(51) Int. Cl.
    *H01M 8/02*    (2006.01)
    *H01M 8/04*    (2006.01)
(52) U.S. Cl. ......... 429/518; 429/457; 429/456; 429/514
(58) Field of Classification Search .................. 429/38, 429/39, 26, 34, 35; 264/297.5, 319
    See application file for complete search history.

(56) References Cited

U.S. PATENT DOCUMENTS

| | | | |
|---|---|---|---|
| 6,777,126 B1 * | 8/2004 | Allen | 429/34 |
| 7,318,973 B2 * | 1/2008 | Rock et al. | 429/35 |
| 2003/0124405 A1 * | 7/2003 | Rock | 429/34 |
| 2004/0137309 A1 * | 7/2004 | Allen et al. | 429/38 |
| 2004/0209150 A1 * | 10/2004 | Rock et al. | 429/38 |

* cited by examiner

*Primary Examiner* — Dah-Wei Yuan
*Assistant Examiner* — Angela J. Martin
(74) *Attorney, Agent, or Firm* — Harness, Dickey & Pierce, P.L.C.

(57) ABSTRACT

A stamped bipolar plate of a fuel cell stack includes a first stamped plate half having a first reactant flow field formed therein, a portion of which defines a first reactant header region. A second stamped plate half has a first coolant flow field formed therein, a portion of which defines a first set of coolant feed channels that extend at least partially across the first reactant header region.

12 Claims, 14 Drawing Sheets

FLUID FLOW PATH FOR STAMPED BIPOLAR PLATE

FIELD OF THE INVENTION

The present invention relates to fuel cells, and more particularly to a stamped bipolar plate of a fuel cell.

BACKGROUND OF THE INVENTION

Fuel cells produce electricity through electrochemical reaction and have been used as power sources in many applications. Fuel cells can offer significant benefits over other sources of electrical energy, such as improved efficiency, reliability, durability, cost and environmental benefits. Fuel cells may eventually be used in automobiles and trucks. Fuel cells may also power homes and businesses.

There are several different types of fuel cells, each having advantages that may make them particularly suited to given applications. One type is a proton exchange membrane (PEM) fuel cell, which has a membrane sandwiched between an anode and a cathode. To produce electricity through an electrochemical reaction, hydrogen ($H_2$) is supplied to the anode and air or oxygen ($O_2$) is supplied to the cathode.

In a first half-cell reaction, dissociation of the hydrogen ($H_2$) at the anode generates hydrogen protons ($H^+$) and electrons ($e^-$). Because the membrane is proton conductive, the protons are transported through the membrane. The electrons flow through an electrical load that is connected across the electrodes. In a second half-cell reaction, oxygen ($O_2$) at the cathode reacts with protons ($H^+$) and electrons ($e^-$) are taken up to form water ($H_2O$). Parasitic heat is generated by the reactions and must be regulated to provide efficient operation of the fuel cell stack.

The fuel cell stack includes coolant flow fields through which a coolant flows. The coolant is a heat transfer fluid that can warm or cool the fuel cell stack depending on the relative temperatures of the coolant and the fuel cell stack components. Traditional coolant flow fields distribute the coolant at varying rates across the fuel cell stack. As a result, there is a non-uniform temperature distribution across the fuel cell stack. Such non-uniform temperature distributions result in inefficient operation of the fuel cell stack and non-uniform stress loads in the fuel cell stack that can degrade the useful life of the fuel cell stack.

Traditionally, bipolar plates divide adjacent fuel cells. Bipolar plates typically include first and second plate halves that each include a reactant flow field and a coolant flow field formed therein. Stamped bipolar plates include first and second stamped halves that consist of sheet metal that is stamped to define the reactant and coolant flow fields. Because each half is stamped to define the desired reactant flow field, the coolant flow field is defined by the impression of the reactant flow field. As a result, the geometry of traditionally stamped coolant flow fields is have a restricted by the geometry of the reactant flow field, providing non-uniform coolant distribution across the fuel cell stack.

SUMMARY OF THE INVENTION

Accordingly, the present invention provides a stamped bipolar plate of a fuel cell stack. The stamped bipolar plate includes a first stamped plate half having a first reactant flow field formed therein, a portion of which defines a first reactant header region. A second stamped plate half has a first coolant flow field formed therein, a portion of which defines a first set of coolant feed channels that extend at least partially across the first reactant header region.

In one feature, the first set of coolant feed channels extend completely across the first reactant header region.

In another feature, the first reactant flow field of the first stamped plate half further defines a second reactant header region. The first coolant flow field of said second stamped plate half further defines a second set of coolant channels that extend at least partially across the second reactant header region.

In other features, the first stamped plate half further includes a second coolant flow field formed therein, a portion of which defines a second set of coolant feed channels. The second stamped plate half includes a second reactant flow field formed therein, a portion of which defines a second reactant header region. The second set of coolant channels extend at least partially across said second reactant header region.

In another feature, the first set of coolant channels includes a plurality of transverse coolant channels that decrease in length along a first portion of a longitudinal axis of the stamped bipolar plate.

In still another feature, the first reactant header region includes a set of longitudinal coolant channels that extend along a longitudinal axis of the stamped bipolar plate.

In yet another feature, the first reactant header region includes a set of diagonal reactant channels that extend across a longitudinal axis and a transverse axis of the bipolar plate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
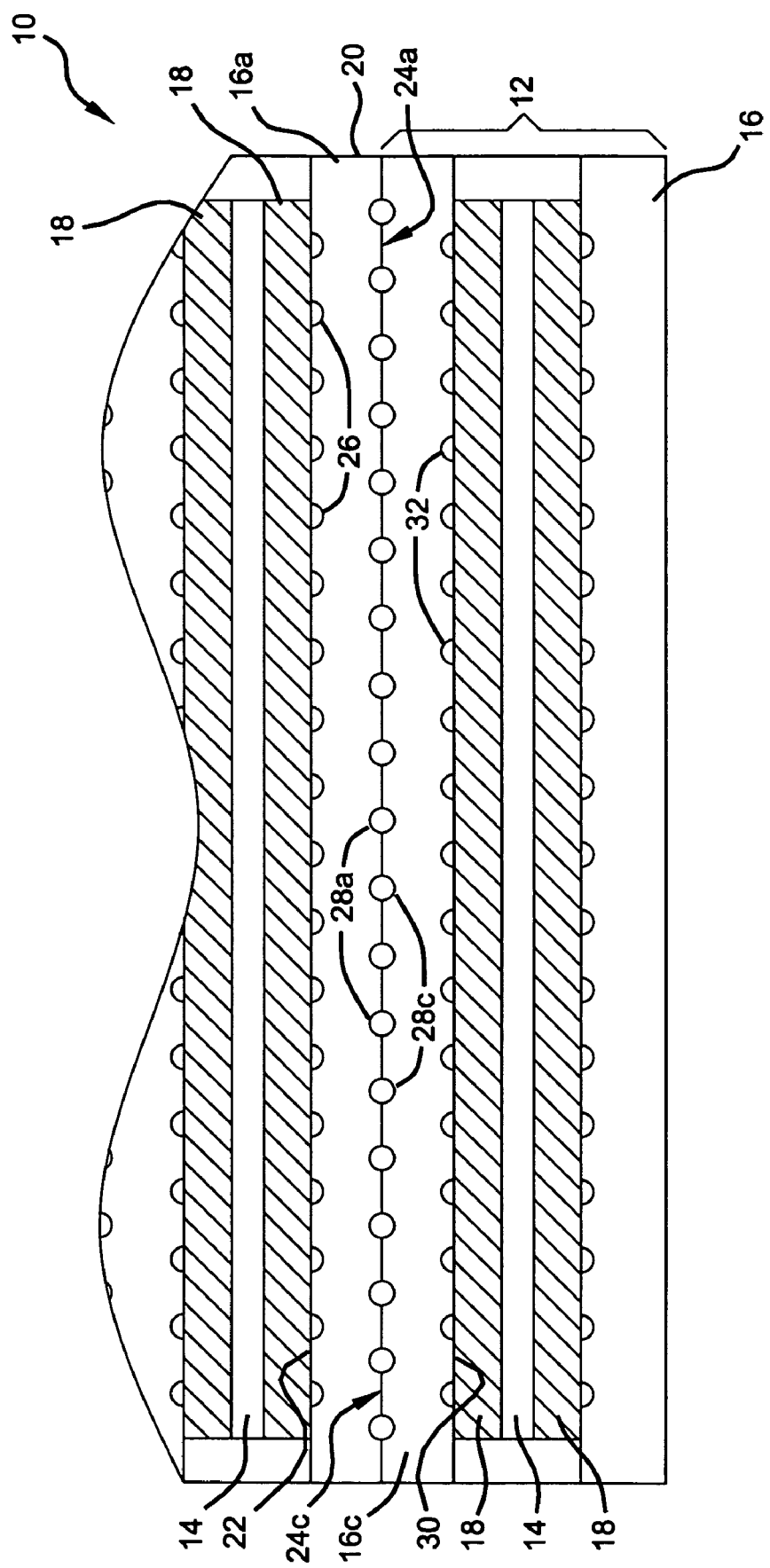
FIG. 1 is a cross-sectional view of a portion of an exemplary fuel cell stack.
Figure 2A:
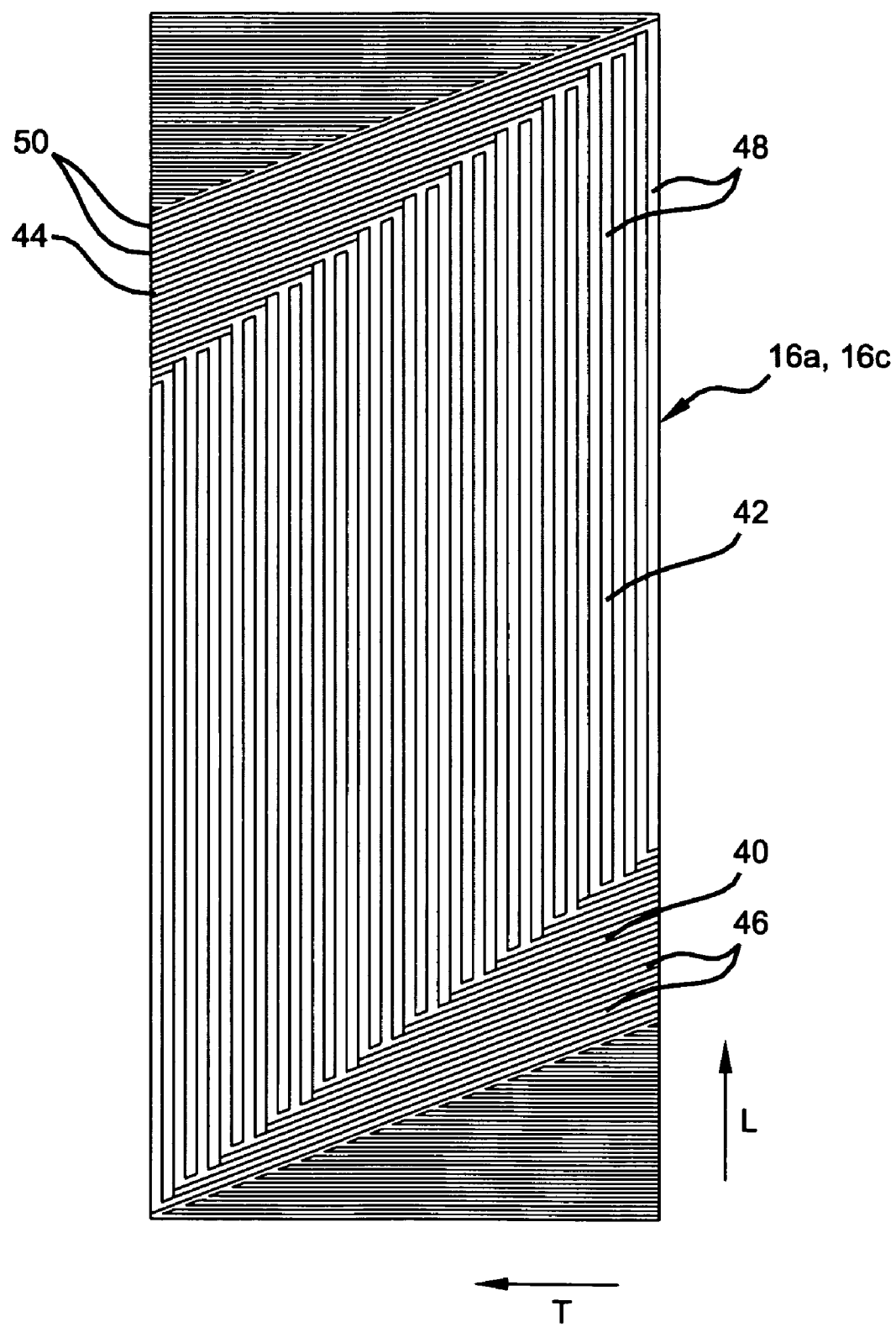
FIG. 2A is a plan view illustrating a flow field geometry integrated into a first reactant side of a first separator plate of a bipolar plate of the fuel cell stack.
Figure 2B:
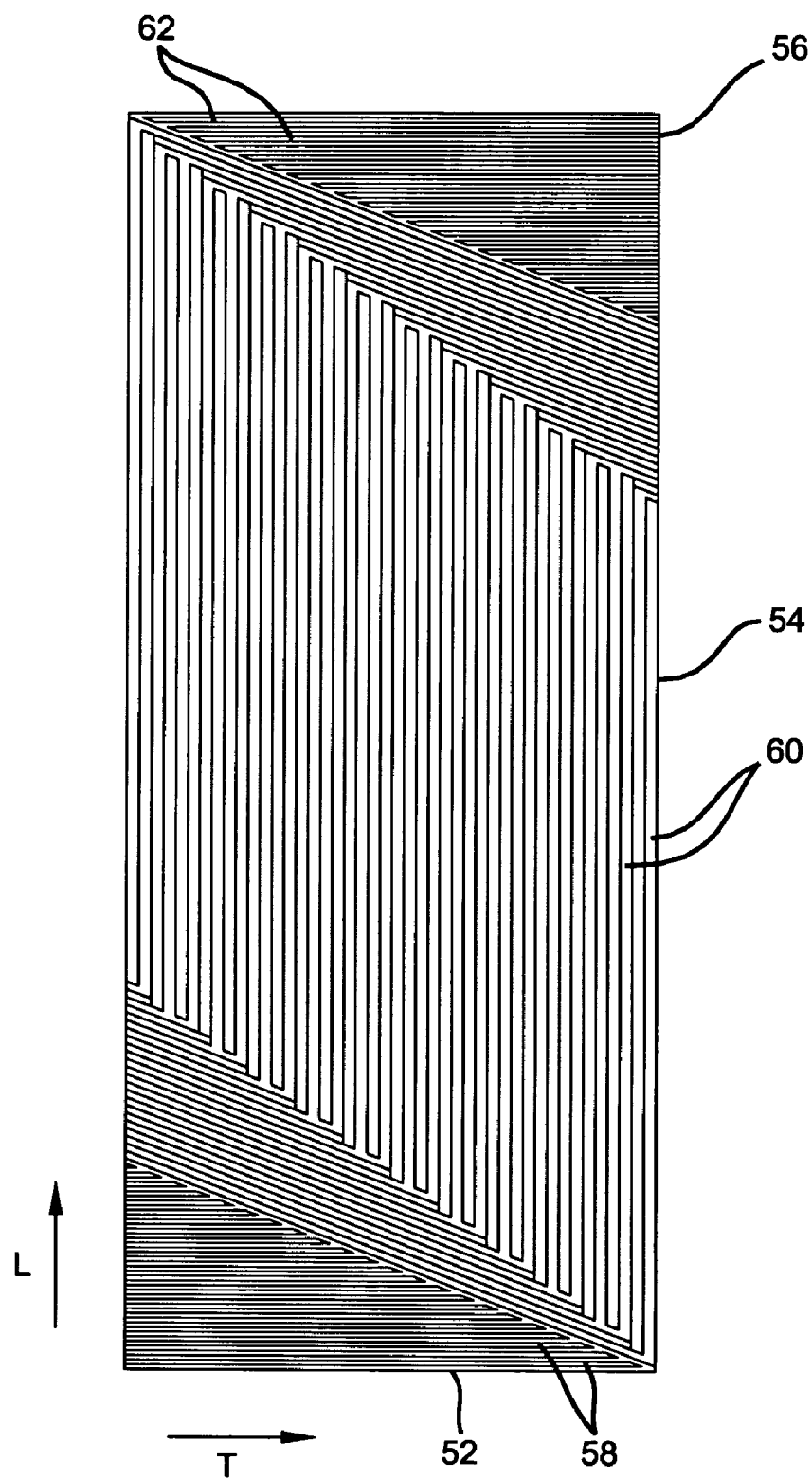
FIG. 2B is a plan view illustrating a flow field geometry integrated into a first coolant side of the first separator plate of a bipolar plate of the fuel cell stack.
Figure 3A:
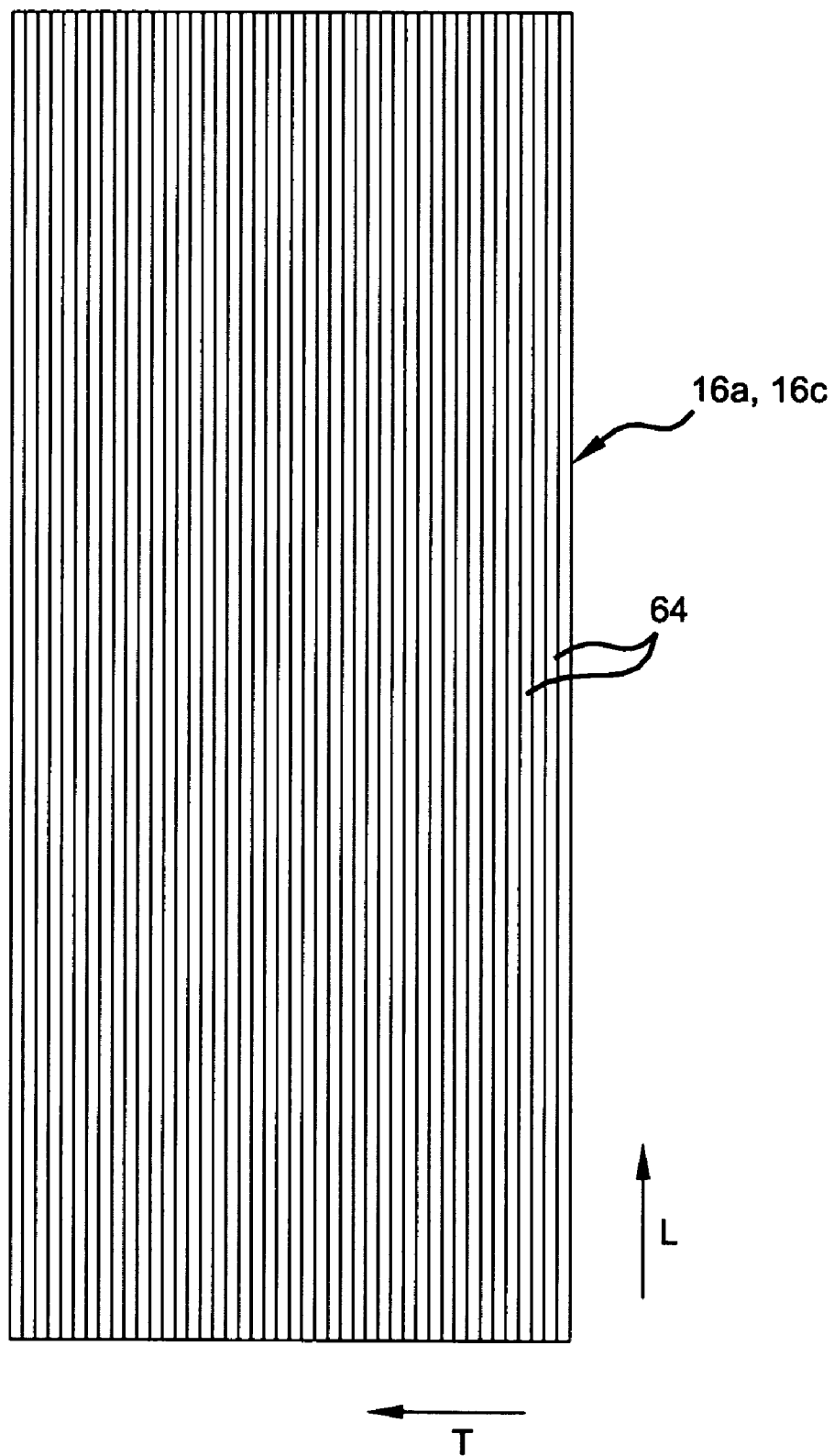
FIG. 3A is a plan view of a coolant side of a second separator plate of the bipolar plate.
Figure 3B:
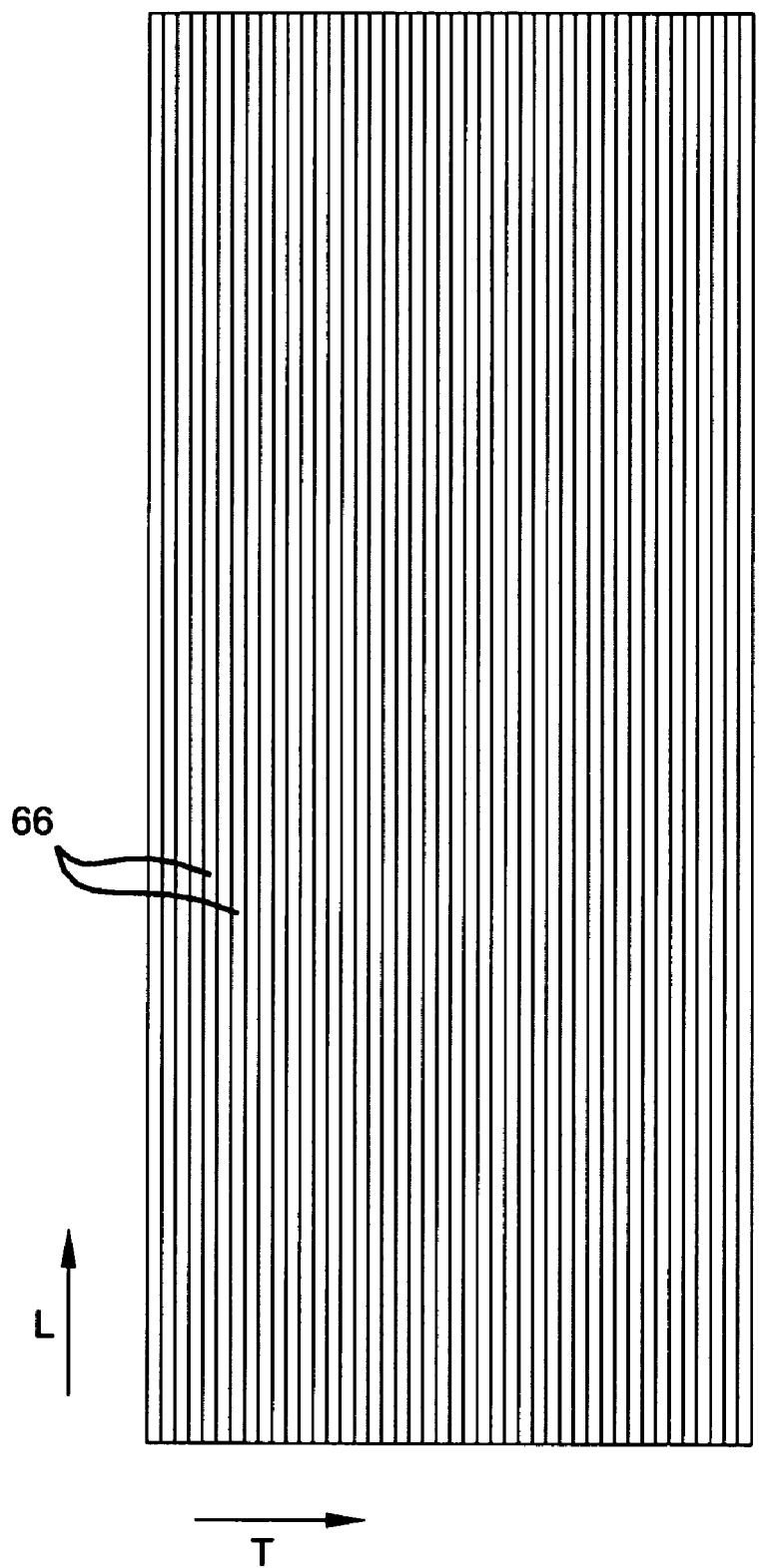
FIG. 3B is a plan view of a reactant side of the second separator plate of the bipolar plate.

Referring now to FIG. 1, a cross-section of a portion of a fuel cell stack 10 is illustrated. The fuel cell stack 10 includes a series of fuel cells 12. Each fuel cell 12 includes a membrane electrode assembly (MEA) 14 sandwiched between separator plates 16. Diffusion media 18 are disposed between the MEA 14 and each of the separator plates 16. An anode reactant (i.e., hydrogen) and a cathode reactant (i.e., oxygen) are distributed by the separator plates 16 for reaction across the MEA 14.

In one instance, the separator plates 16 are combined as a bipolar plate 20. Each bipolar plate 20 includes an anode separator plate 16a and a cathode separator plate 16c. The anode separator plate 16a has an anode face 22 and a coolant face 24a. An anode flow field 26 is formed in the anode face 22 and a partial coolant flow field 28a is formed in the coolant face 24a. The cathode separator plate 16c includes a cathode face 30 and a coolant face 24c. A cathode flow field 32 is formed in the cathode face 30 and a partial coolant flow field 28c is formed in the coolant face 24c. The anode separator plate 16a and cathode separator plate 16c are stacked together so the coolant faces 24a,24c lie adjacent to one another. The partial coolant flow fields 28a,28c of the coolant faces 24a, 24c align to form fluid channels having a flow field geometry according to the present invention.

Referring now to FIGS. 2A through 3B, the flow field geometry of the bipolar plate of the present invention will be described in detail. The flow field geometry is integrated into the coolant face 24a,24c of the first separator plate, which is either the anode or cathode separator plate 16a,16c. The flow field geometry is oriented relative to a transverse axis (T) and a longitudinal axis (L). The flow field geometry includes a first reactant region 40, a second reactant region 42 and a third reactant region 44 formed in the reactant side. The first reactant region includes a first set of reactant channels 46 formed in the reactant face of the separator plate 16a,16c. The second and third reactant regions 42,44 respectively include second and third sets of reactant channels 48,50 formed in the reactant face of the separator plate 16a,16c.

The flow field geometry further includes a first coolant region 52, a second coolant region 54 and a third coolant region 56 formed in the coolant side. The first coolant region 52 includes a first set of coolant channels 58 formed in the coolant face of the separator plate 16a,16c. The second and third coolant regions 54,56 respectively include second and third sets of coolant channels 60,62 formed in the coolant face of the separator plate 16a,16c.

The first set of coolant channels 58 extend across the separator plate 16a, 16c along the transverse axis. The lengths of the first set of coolant channels 58 decrease along the longitudinal axis. In this manner, the first coolant region 52 forms a right triangle-shaped profile. The third set of coolant channels 62 extend across the separator plate 16a,16c along the transverse axis. The lengths of the third set of coolant channels 62 increase along the longitudinal axis. In this manner, the third coolant region 56 forms a right triangle-shaped profile. The second coolant region 54 is disposed between the first and third reactant regions 40,44 as explained in further detail below.

The first reactant region 40 is disposed between the first and second coolant regions 52,54. The first set of reactant channels 46 extend diagonally across the separator plate 16a, 16c across the transverse and longitudinal axes. The lengths of the first set of reactant channels 46 decrease along the longitudinal axis. That is to say, the reactant channel 46 adjacent to the first coolant region 52 is the longest and the reactant channel 46 adjacent to the second coolant region 54 is the shortest. In this manner, the first reactant region 40 forms an obtuse triangle-shaped profile.

The third reactant region 44 is disposed between the second and third coolant regions 54,56. The third set of reactant channels 50 extend diagonally across the separator plate 16a, 16c along the transverse and longitudinal axes. The lengths of the third set of reactant channels 50 increase along the longitudinal axis. That is to say, the reactant channel 50 adjacent to the second coolant region 54 is the shortest and the reactant channel 50 adjacent to the third coolant region 56 is the longest. In this manner, the third reactant region 44 forms an obtuse triangle-shaped profile.

The second coolant region 54 and the second reactant region 42 are integrated. More particularly, the second set of coolant channels 60 are formed in the separator plate 16a,16c and extend along the longitudinal axis. The second set of reactant channels 48 are coincidentally formed in the separator plate 16a,16c and extend along the longitudinal axis, parallel to the second coolant channels 60. A first boundary of the integrated second coolant and reactant regions 54,42 slopes along the first reactant region 40 and a second boundary slopes along the third reactant region 44. In this manner, the integrated second coolant and reactant regions 54,42 define a parallelogram-shaped profile.

The second separator plate, which is the other of the anode and cathode separator plates 16a,16c, includes a fourth set of coolant channels 64 formed in the coolant side and a fourth set of reactant channels 66 formed in the reactant side. The fourth set of coolant channels 64 and the fourth set of reactant channels 66 are coincidentally formed in the separator plate 16a,16c and extend along the longitudinal axis in parallel.

The first and second separator plates are bonded together to form the bipolar plate 20. More particularly, the coolant face of the separator plate having the multiple reactant and coolant regions is placed adjacent to the coolant face of the separator plate having the parallel reactant and coolant channels. The second set of coolant channels 60 are aligned with the fourth set of coolant channels 64. In this manner, the second and fourth sets of coolant channels 60,64 combine to form a coolant flow path along the second coolant region 54.

Figure 4:
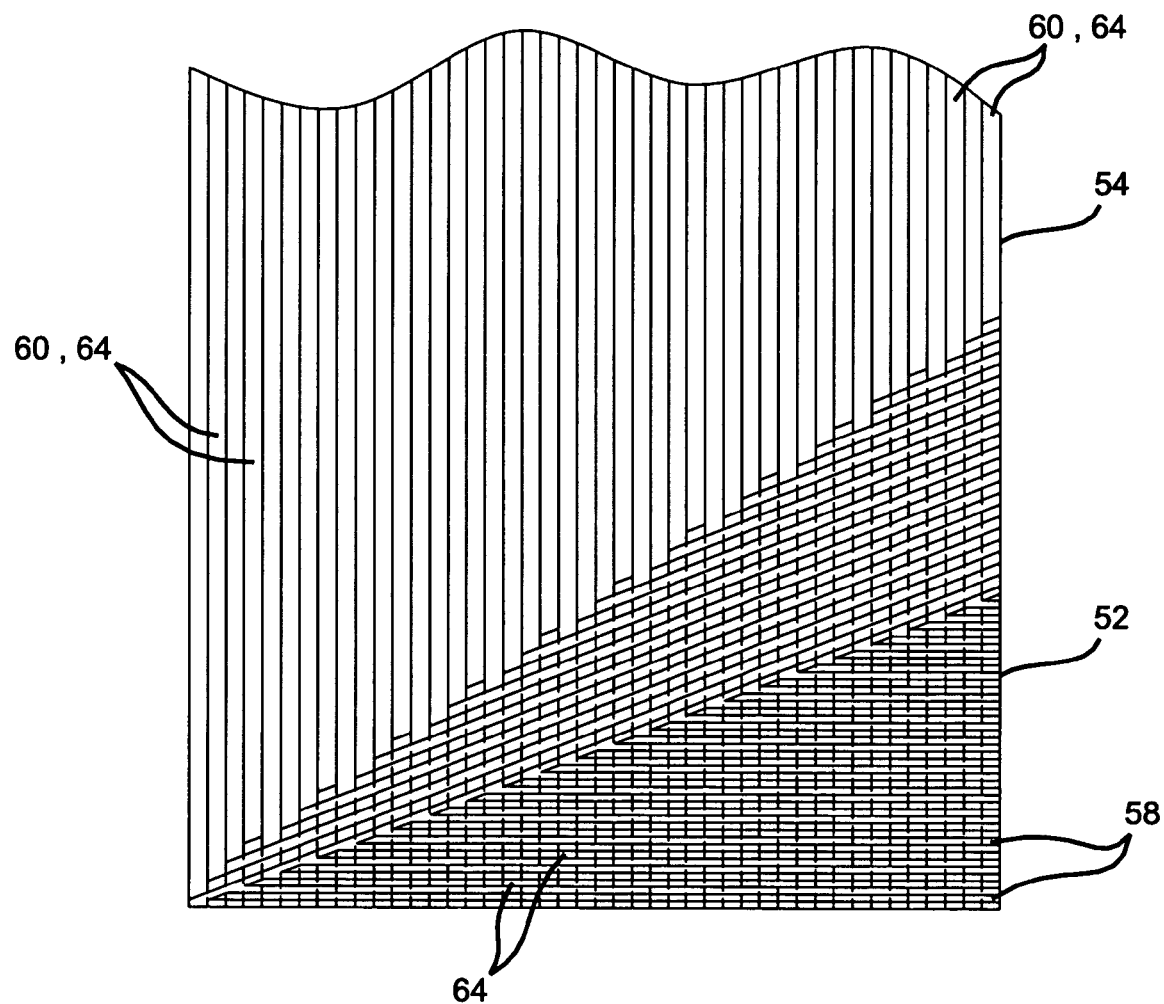
FIG. 4 is a plan view of the bipolar plate illustrating cross-linking of the flow field geometry.

Referring now to FIG. 4, the first and second coolant regions 52,54 are in fluid communication via the fourth set of coolant channels 64 (shown in phantom). More particularly, the fourth set of coolant channels 64 bisect and are intermittently cross-linked with the first set of coolant channels 58. Fluid flow through the first set of coolant channels 58 is divided into the fourth set of coolant channels 64 as it flows across the first set of coolant channels 58. The fluid flows under the first reactant region 40 through the fourth set of coolant channels 64 and into the combined coolant flow paths of the second and fourth coolant channels 60,64.

Similarly, the second and third coolant regions 54,56 are in fluid communication via the fourth set of coolant channels 64. The fourth set of coolant channels 64 bisect and are intermittently cross-linked with the third set of coolant channels 62.

Fluid flow through the combined fluid flow paths flows under the third reactant region 44 through the fourth set of coolant channels 64. The fluid is directed into the third set of coolant channels 62 through the cross-linked areas.

Figure 5:
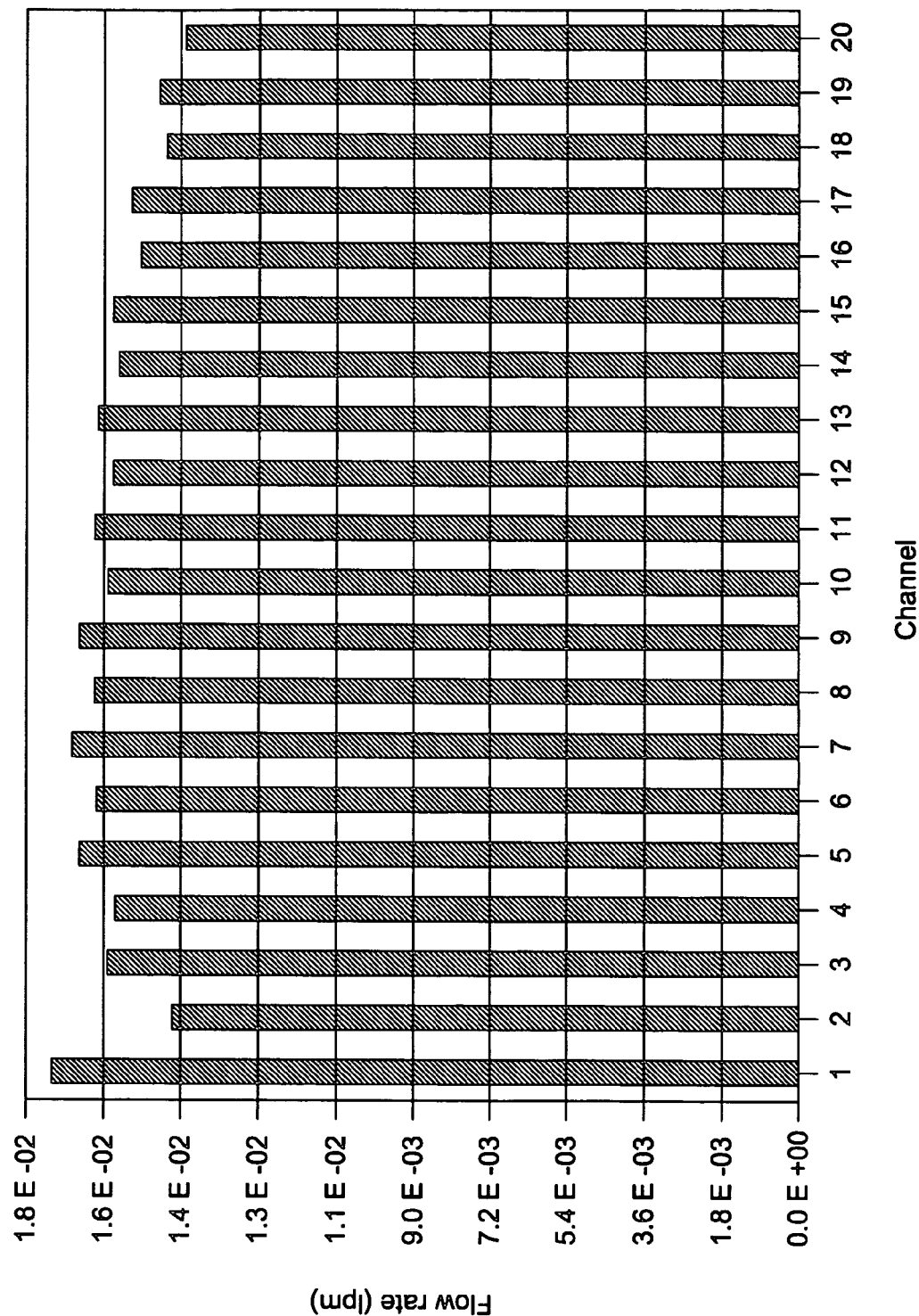
FIG. 5 is a graph illustrating a fluid flow rate profile across the bipolar plate.

Referring now to FIG. 5, a graph illustrates fluid flow rate through the combined coolant flow paths (coolant channels 60,64). As illustrated, the flow field geometry provides a generally uniform flow rate profile across the coolant flow paths. The generally uniform flow rate is achieved because the first coolant region 52 enables fluid flow across the width of the first separator plate. The third coolant region 56 enables fluid flow back across the width of the separator plate. Additionally, the first, second and third sets of coolant channels 58,60,62 define equidistant fluid flow paths. For example, the shortest coolant channel of the first set of coolant channels 58 communicates with the longest coolant channel of the third set of coolant channels 62 and vice-versa. Therefore, the pressure drop of the fluid flow across the bipolar plate 20 is equal for all fluid flow paths.

Referring now to FIGS. 6A through 7B, an alternative flow field geometry of the present invention will be described in detail. The flow field geometry is integrated into the first separator plate (either the anode separator plate 16a or the cathode separator plate 16c) and is oriented relative to a transverse axis (T) and a longitudinal axis (L). The alternative flow field geometry integrates the flow field geometry described in detail above with respect to FIG. 2. More particularly, the alternative flow field geometry includes a first reactant region 70, a second reactant region 72 and a third reactant region 74 formed in the reactant side. The first reactant region 70 includes a first set of reactant channels 76 formed in the reactant face of the separator plate 16a,16c. The second and third reactant regions 72,74 respectively include second and third sets of reactant channels 77,78 formed in the reactant face of the separator plate 16a,16c.

The alternative flow field geometry further includes a first coolant region 80, a second coolant region 82 and a third coolant region 84 formed in the coolant side. The first coolant region 80 includes a first set of coolant channels 86 formed in the coolant face of the separator plate 16a,16c. The second and third coolant regions 82,84 respectively include second and third sets of coolant channels 88,90 formed in the coolant face of the separator plate 16a,16c.

The first set of coolant channels 86 extend across a portion of the separator plate 16a,16c along the transverse axis. The lengths of the first set of coolant channels 86 decrease along the longitudinal axis. In this manner, the first coolant region 80 forms a right triangle-shaped profile. The third set of coolant channels 90 extend across another portion of the separator plate 16a,16c along the transverse axis. The lengths of the third set of coolant channels 90 increase along the longitudinal axis. In this manner, the third coolant region 84 forms a right triangle-shaped profile. The second coolant region 82 is disposed between the first and third reactant regions 70,74 as explained in further detail below.

The first reactant region 70 is disposed between the first and second coolant regions 80,82. The first set of reactant channels 76 include first, second and third legs 92,94,96, respectively. The first legs 92 extend along the longitudinal axis and decrease in length across the transverse axis. In this manner, the first legs 92 define a right triangle-shaped profile. The second legs 94 extend along the transverse axis and generally decrease in length across the longitudinal axis. The third legs 96 extend from the second legs 94 diagonally across the separator plate 16a,16c. More specifically, the third legs 96 extend diagonally across the transverse and longitudinal axes. The lengths of the third legs 96 decrease across the longitudinal axis. In this manner, the third legs 96 form an obtuse triangle-shaped profile.

The third reactant region 74 is disposed between the second and third coolant regions 82,84 and is an inverted mirror-image of the first reactant region 70. The third set of reactant channels 78 includes first, second and third legs 98,100,102, respectively. The first legs 98 extend along the longitudinal axis and increase in length across the transverse axis. In this manner, the first legs 98 define a right triangle-shaped profile. The second legs 100 extend along the transverse axis and generally increase in length across the longitudinal axis. The third legs 102 extend from the second legs 100 diagonally across the separator plate 16a,16c. More specifically, the third legs 102 extend diagonally across the transverse and longitudinal axes. The lengths of the third legs 102 increase along the longitudinal axis. In this manner, the third legs 102 form an obtuse triangle-shaped profile.

The second coolant region 82 and the second reactant region 72 are integrated. More particularly, the second set of coolant channels 88 are formed in the separator plate 16a,16c and extend along the longitudinal axis. The second set of reactant channels 72 are coincidentally formed in the separator plate 16a,16c and extend along the longitudinal axis, parallel to the second coolant channels 88. A first boundary of the integrated second coolant and reactant regions 82,72 slopes along the first reactant region 70 and a second boundary slopes along the third reactant region 74.

The second separator plate (i.e., the other of the anode and cathode separator plates) includes a fourth set of coolant channels 104 formed in the coolant side and a fourth set of reactant channels 106 formed in the reactant side. The fourth set of coolant channels 104 and fourth set of reactant channels 106 are coincidentally formed in the separator plate 16a,16c.

The fourth set of coolant channels 104 include first, second, third, fourth and fifth legs, 108,110,112,114,116, respectively. The first legs 108 extend along the longitudinal axis and decrease in length across the transverse axis. The second legs 110 extend across the transverse axis and decrease in length across the longitudinal axis. In this manner, the second legs 110 define an obtuse triangle-shaped profile. The third legs 112 extend along the longitudinal axis and interconnect the second and fourth legs 110,114. The fourth legs 114 extend along the transverse axis and increase in length across the longitudinal axis. In this manner, the fourth legs 114 define an obtuse triangle-shaped profile. The fifth legs 116 extend along the longitudinal axis and increase in length across the transverse axis.

Because the fourth set of reactant channels 106 are coincidentally formed in the separator plate 16a,16c, the fourth set of reactant channels also include first, second, third, fourth and fifth legs, 118,120,122,124,126, respectively. The first, second, third, fourth and fifth legs 118,120,122,124,126 are formed in the separator plate 16a,16c in the same orientation as described above with respect to the fourth set of coolant channels 104. In this manner, the legs of the fourth set of reactant channels 106 run parallel to the respective legs of the fourth set of coolant channels 104.

The first and second separator plates are bonded together to form the bipolar plate 20. More particularly, the coolant face of the first separator plate is placed adjacent to the coolant face of the second separator plate and the second set of coolant channels 88 are aligned with the fourth set of coolant channels 104. In this manner, the second and fourth sets of coolant channels 88,104 combine to form the coolant flow path along the second coolant region 82.

The first and second coolant regions 80,82 are in fluid communication via the fourth set of coolant channels 104.

Fluid flow from the first coolant region 80 flows beneath the first reactant region 70 and into the combined fluid flow paths via the fourth set of coolant channels 104. Similarly, the second and third coolant regions 82,84 are in fluid communication via the fourth set of coolant channels 104. Fluid flow through the combined fluid flow paths flows under the third reactant region 74 through the fourth set of coolant channels 104.

Figure 8A:
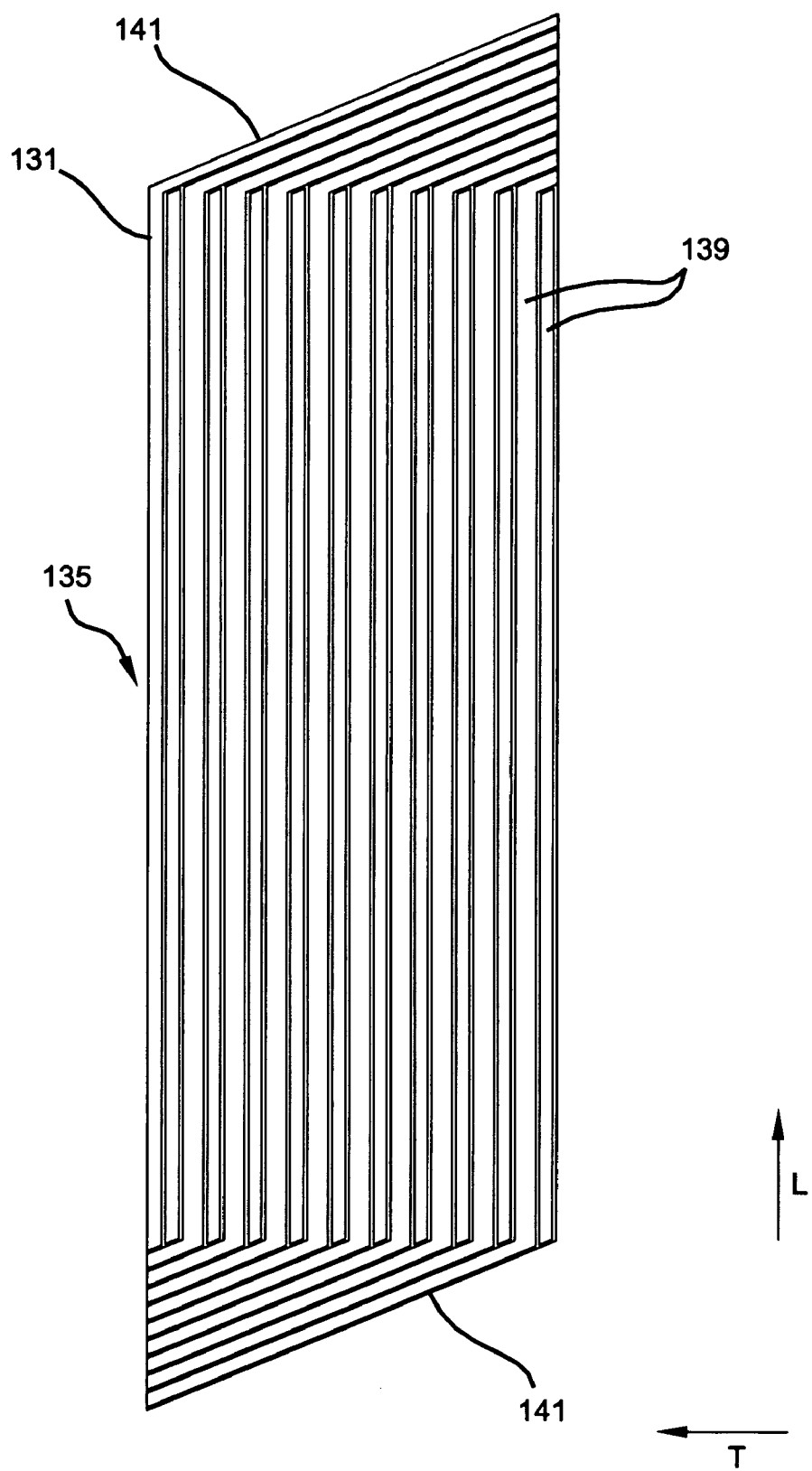
FIG. 8A is a plan view of another alternative coolant side of the first separator plate of the bipolar plate.
Figure 8B:
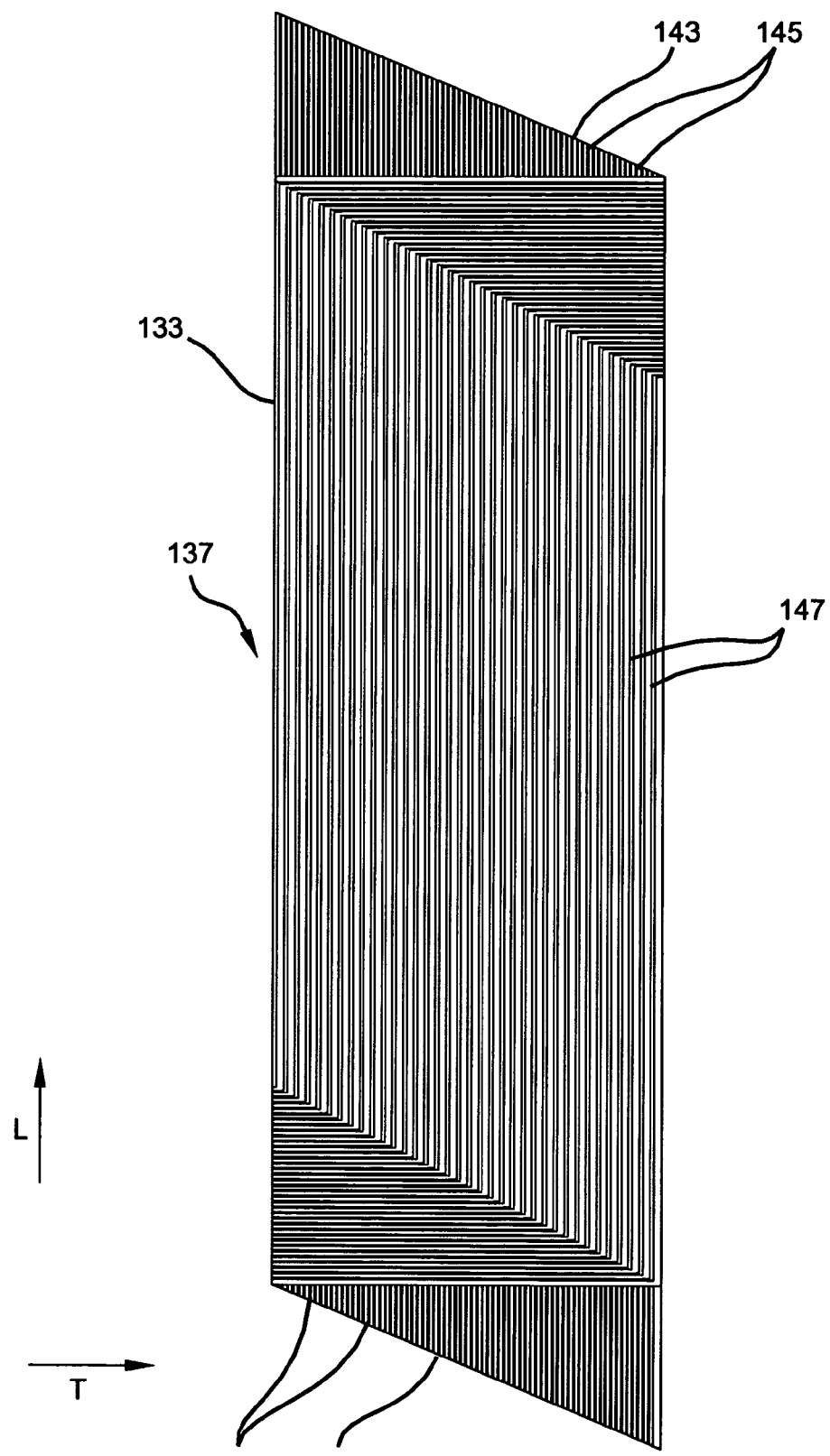
FIG. 8B is a plan view of another alternative coolant side of the second separator plate.

Referring now to FIGS. 8A and 8B, alternative coolant sides 131,133 of first and second separator plates 135,137 are respectively illustrated. The coolant side 131 of the first separator plate 135 includes coolant channels 139 that extends along the axis L and that are disposed between reactant feed/discharge regions 141. The coolant channels 139 are defined by impressions that define reactant channels on the reactant side of the first separator plate 135.

The coolant side of the second separator plate 137 includes coolant feed/discharge regions 143 including respective coolant channels 145 that change in length down the axis T. The coolant feed/discharge regions 143 define a triangular-shaped profile. The coolant side of the second separator plate 137 further includes S-shaped coolant channels 147 disposed between the coolant feed/discharge regions 143. The S-shaped coolant channels 147 are defined by impressions that define reactant channels on the reactant side of the second separator plate 137.

In operation, coolant flows into the bipolar plate at one of the coolant feed/discharge regions 143. The coolant flows beneath the corresponding reactant feed/discharge region 141 of the adjacent first separator plate 135. Having passed beneath the reactant feed/discharge region 141, the coolant flows into the combined coolant channels 139 and 147, across the bipolar plate. At the other end of the bipolar plate, the coolant flows beneath the other reactant feed/discharge region 141 into the other coolant feed/discharge region 143, where it is exhausted from the bipolar plate.

Figure 6A:
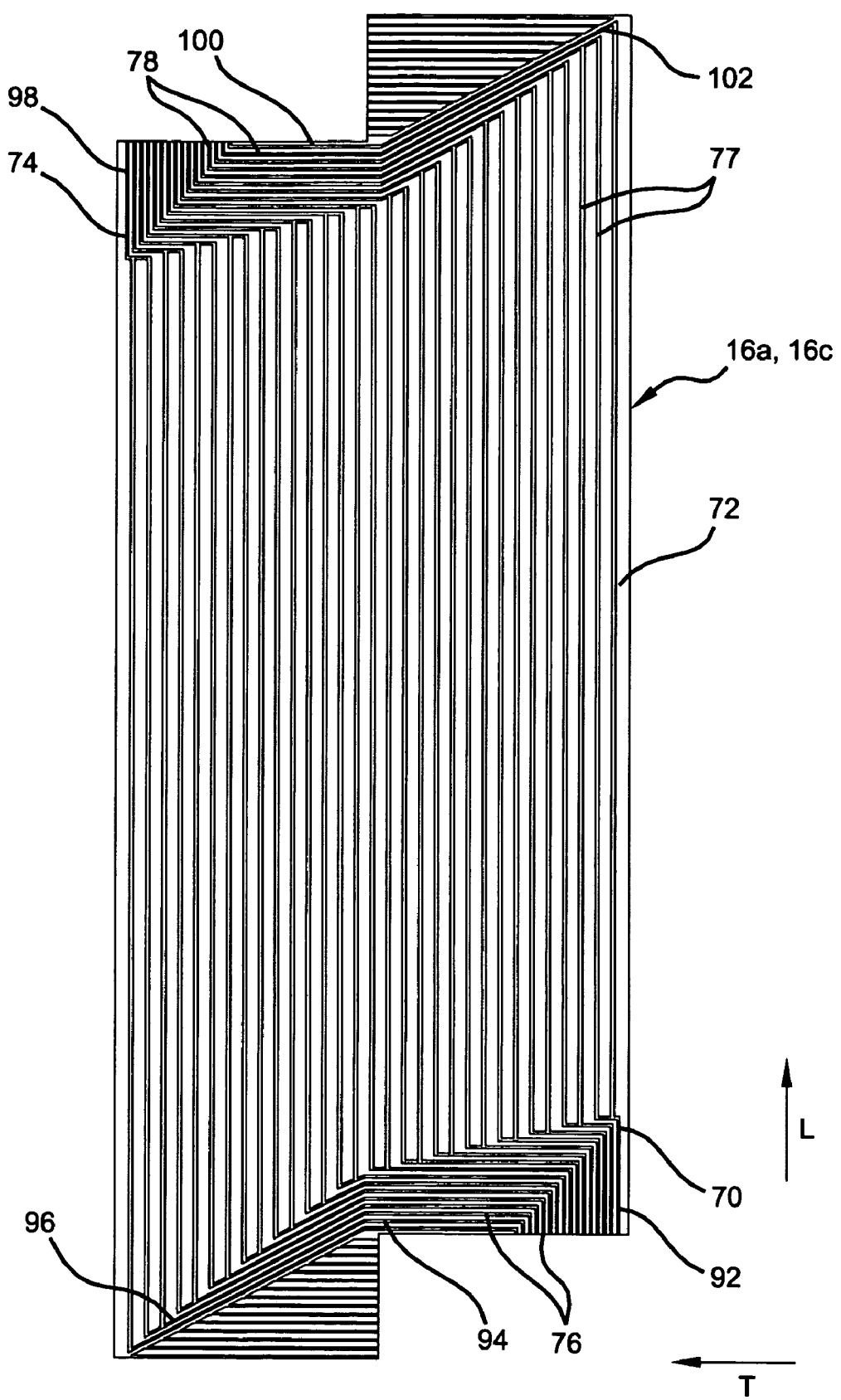
FIG. 6A is a plan view of an alternative flow field geometry integrated into the first reactant side of the first separator plate of the bipolar plate.
Figure 6B:
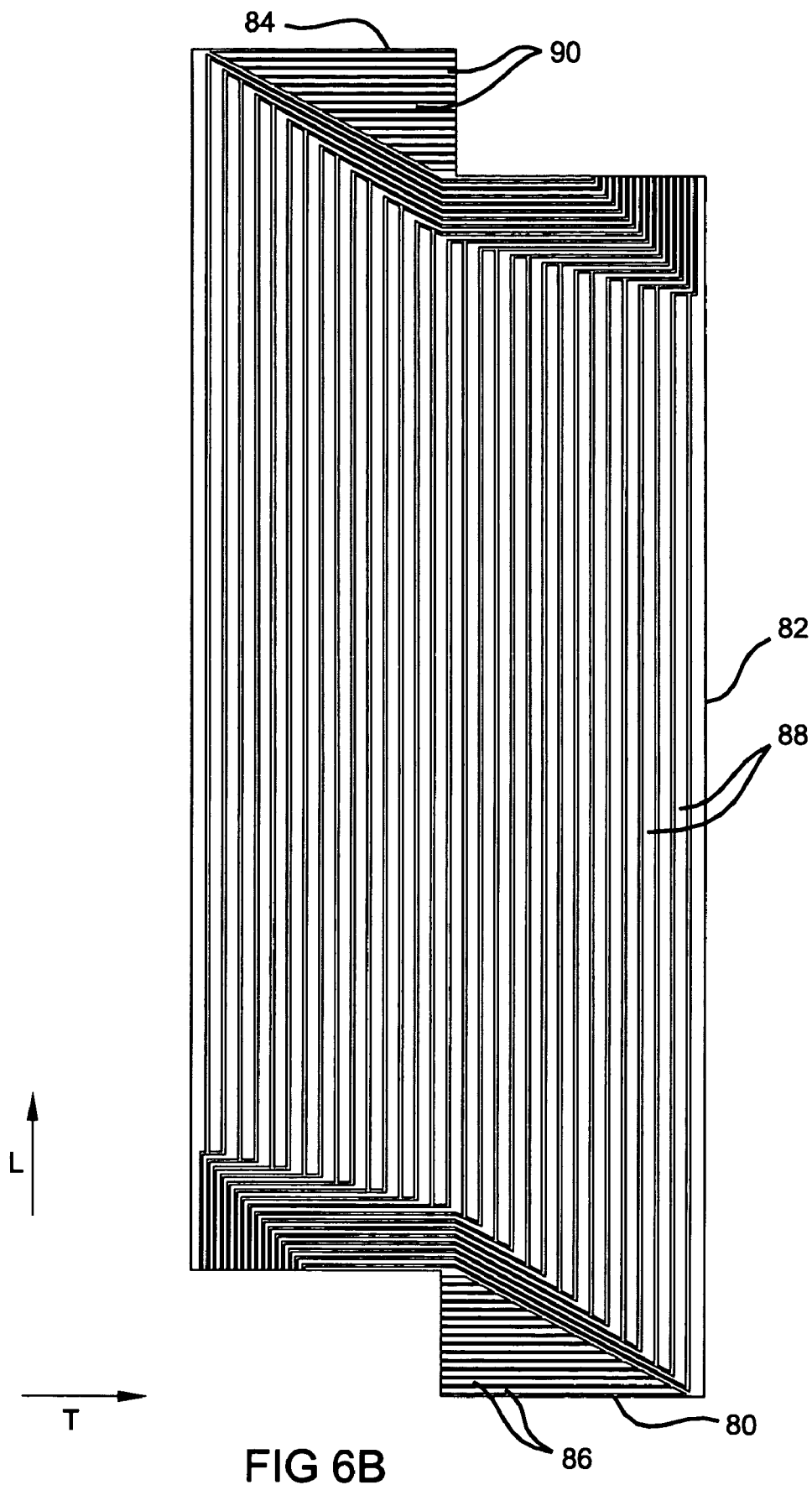
FIG. 6B is a plan view of an alternative flow field geometry integrated into the coolant side of the first separator plate of the bipolar plate.
Figure 7A:
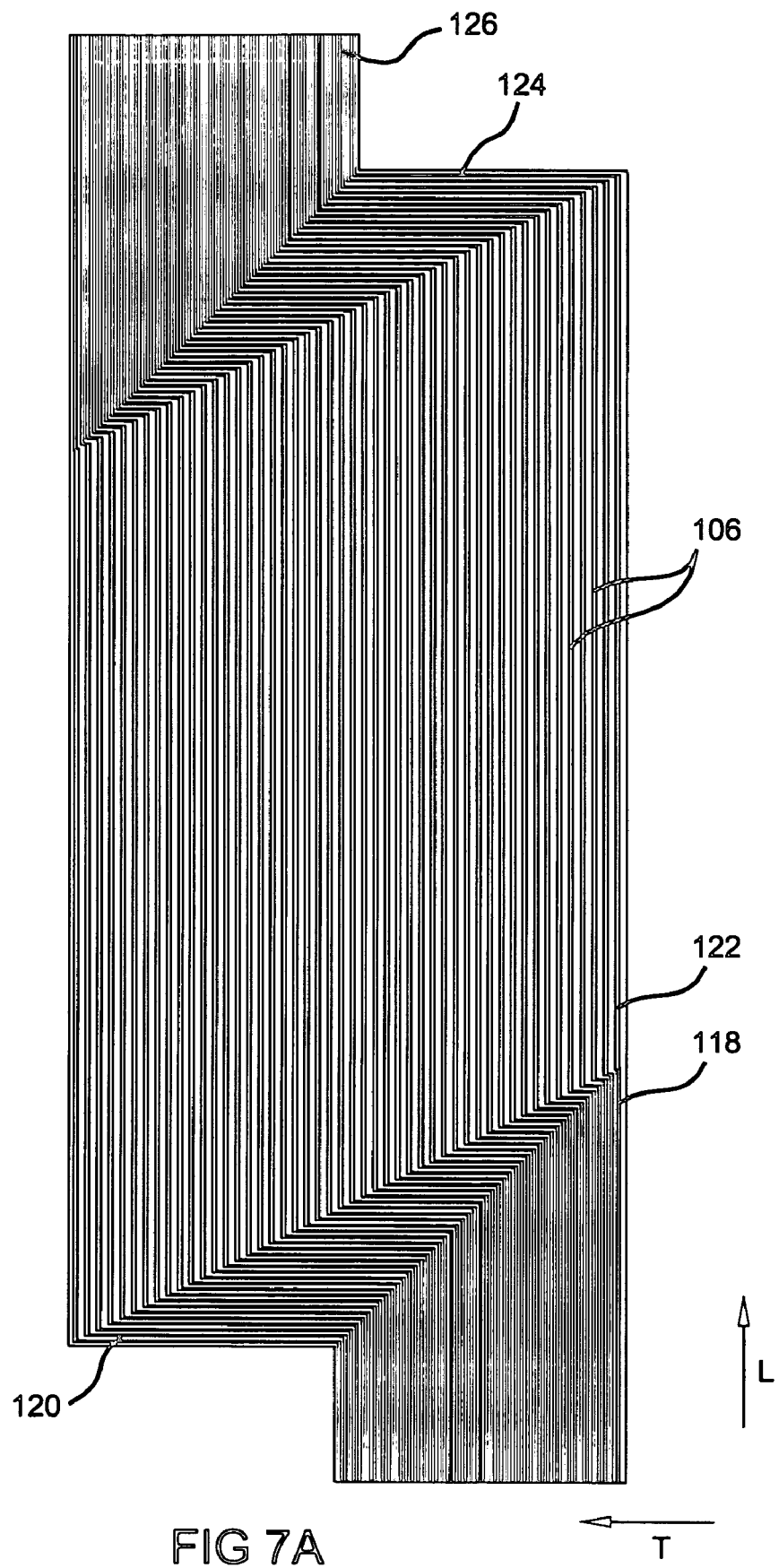
FIG. 7A is a plan view of an alternative reactant side of the second separator plate of the bipolar plate.
Figure 7B:
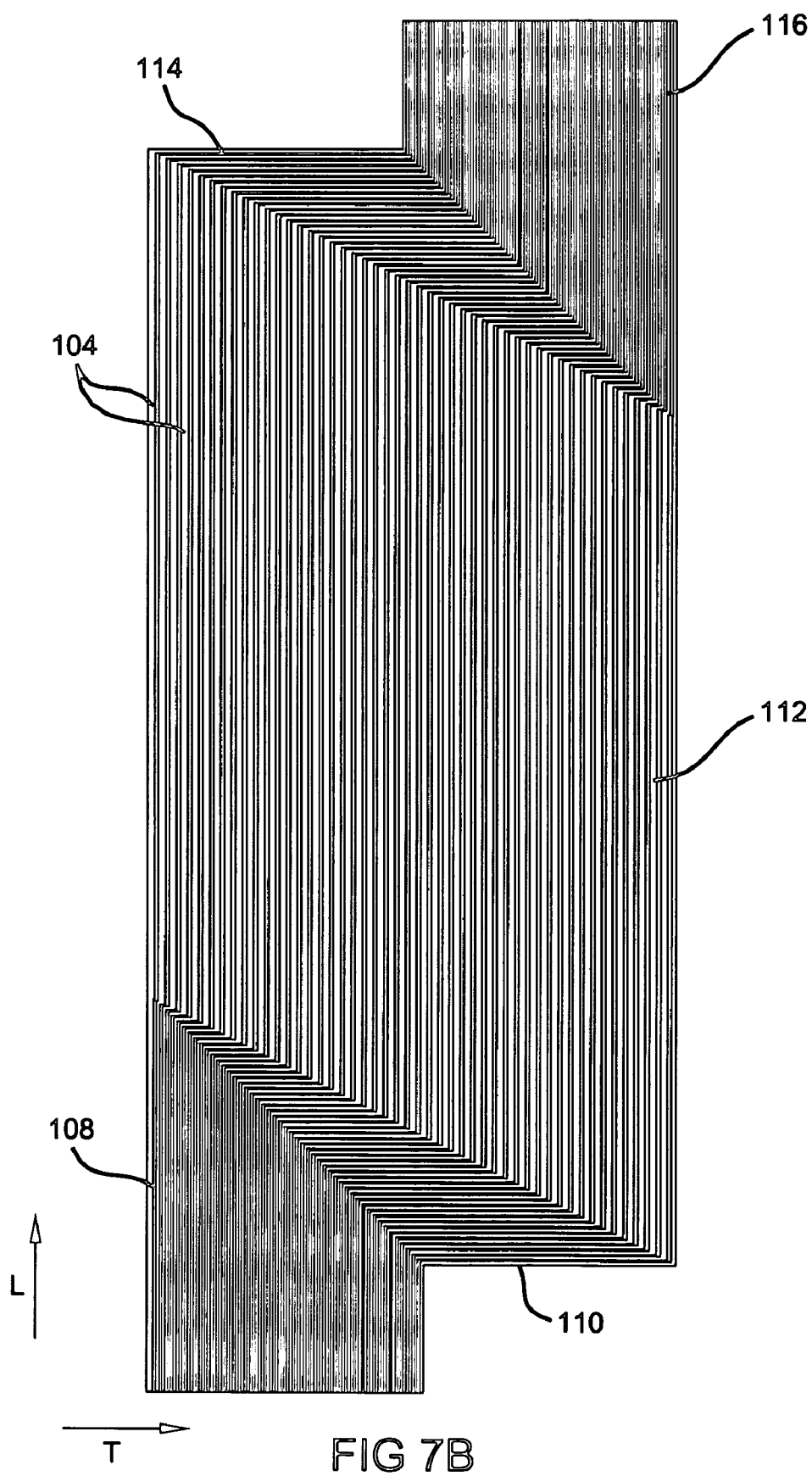
FIG. 7B is a plan view of an alternative coolant side of the second separator plate of the bipolar plate.
Figure 9:
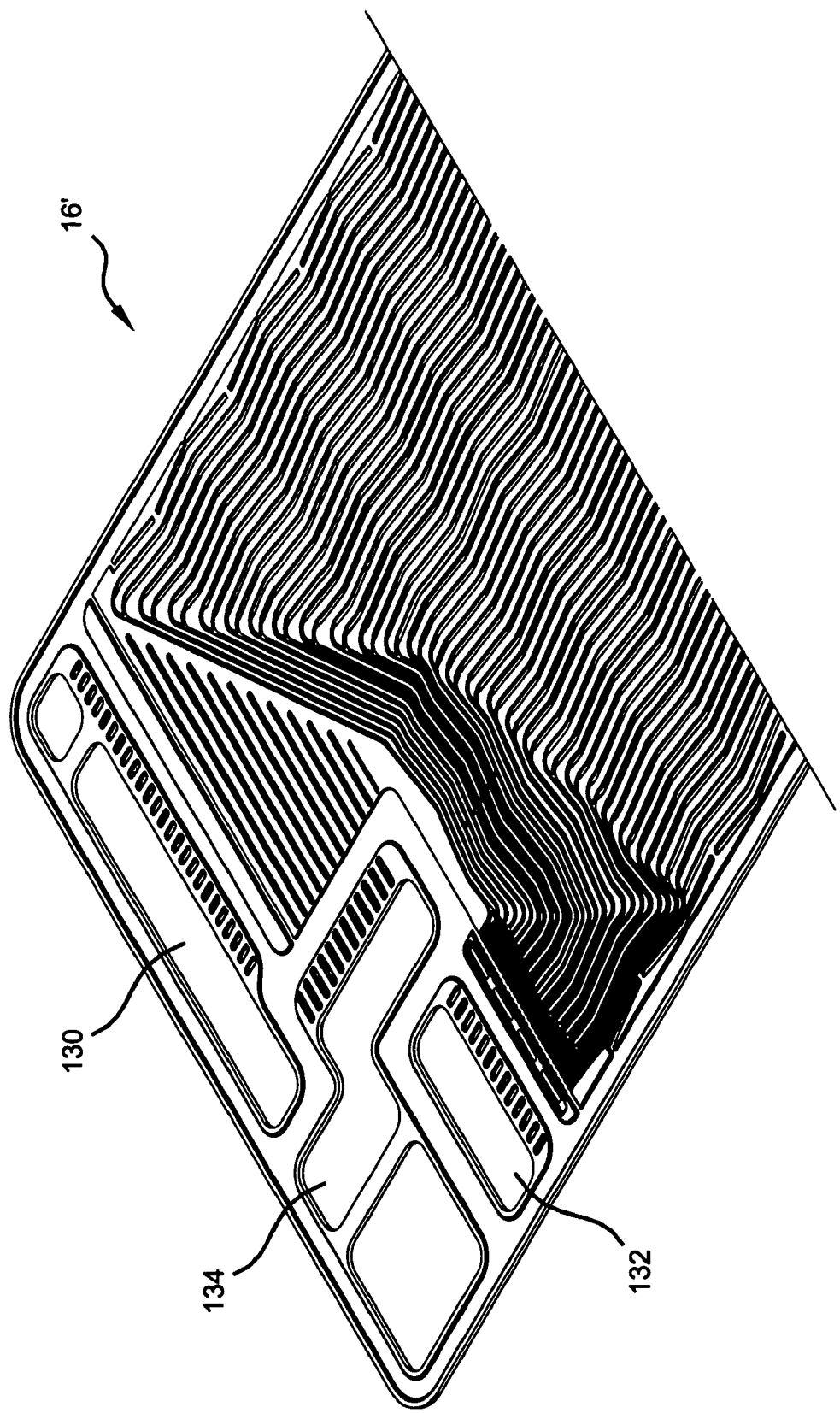
FIG. 9 is a perspective view of a separator plate that includes the alternative flow field geometry of FIG. 6A.

Referring now to FIG. 9, a portion an exemplary separator plate 16' is illustrated and incorporates the alternative flow field geometry of FIG. 6. The exemplary separator plate 16' can be formed in various manners known in the art, and is preferably formed from stamped sheet metal. The first/third coolant regions, the second coolant region, the first/third reactant regions and the second reactant region are formed in the separator plate 16'. A first reactant header 130 is in fluid communication with the fourth reactant region to distribute a first reactant across the bipolar plate. A second reactant header 132 is in fluid communication with the first/third and second reactant regions to distribute a second reactant across the bipolar plate. A coolant header 134 is in fluid communication with the first/third and second coolant regions to distribute coolant across the bipolar plate.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A stamped bipolar plate of a fuel cell stack, comprising:
   a first stamped plate half having opposed first and second faces, a first reactant flow field formed in the first face of the first stamped plate, a portion of which defines a first reactant header region, and a partial coolant flow field formed in the second face of the first stamped plate; and
   a second stamped plate half having opposed first and second faces, a partial first coolant flow field formed in the second face of the second stamped plate, a portion of which defines a first set of coolant feed channels that extend at least partially across said first reactant header region;
   wherein said first and second stamped plate halves are attached together having only the second face of each facing one another and said first set of coolant feed channels are a plurality of longitudinally extending straight channels that are parallel to one another and form an entirety of said first coolant flow field;
   said first stamped plate half further includes a second coolant flow field formed therein and facing said first coolant flow field, a portion of which defines a second set of coolant feed channels; and
   a shortest coolant channel of the first set of coolant feed channels communicates with a longest coolant feed channel of the second set of coolant feed channels and vice-versa, whereby a pressure drop of the fluid flow across the bipolar plate is equal for all coolant feed channels.

2. The stamped bipolar plate of claim 1 wherein said first set of coolant feed channels extend completely across said first reactant header region.

3. The stamped bipolar plate of claim 1 wherein said first reactant flow field of said first stamped plate half further defines a second reactant header region and said first coolant flow field of said second stamped plate half extends at least partially across said second reactant header region.

4. The stamped bipolar plate of claim 1 wherein said second stamped plate half includes a second reactant flow field formed therein, a portion of which defines a second reactant header region that faces away from said first stamped plate half, said second reactant header region including a plurality of longitudinally extending straight channels that are parallel to one another and form an entirety of said second reactant flow field.

5. The stamped bipolar plate of claim 4 wherein said second set of coolant channels extend at least partially across said second reactant header region.

6. The stamped bipolar plate of claim 1 wherein said first reactant header region includes a set of diagonal reactant channels that extend across a longitudinal axis and a transverse axis of said bipolar plate.

7. A stamped bipolar plate of a fuel cell stack, comprising:
   a planar first stamped plate half having opposed first and second faces, a first reactant flow field formed in the first face of the first stamped plate, a portion of which defines a first reactant header region, and second and third coolant flow fields formed in the second face of the first stamped plate; and
   a planar second stamped plate half having opposed first and second faces, a first coolant flow field formed in the second face of the second stamped plate, a portion of which defines a first set of coolant feed channels that extend at least partially across said first reactant header region,
   wherein said first stamped plate half has the second and third coolant flow fields separated by said first reactant flow field such that said second and third coolant flow fields only communicate with one another through said first coolant flow field;
   said second coolant flow field defining a second set of coolant feed channels; and
   a uniform flow rate profile across the coolant flow channels is achieved by the first coolant flow field enabling fluid flow across a width of a first separator plate, and the second coolant flow field enabling fluid flow back across the width of the separator plate, the coolant feed channels defining equidistant fluid flow paths, a shortest coolant feed channel of the first set of coolant feed channels communicating with a longest coolant feed channel of the second set of coolant feed channels and vice-versa, thereby equalizing a pressure drop across the bipolar plate for all coolant fluid flow channels.

8. The stamped bipolar plate of claim 7, wherein said first set of coolant feed channels are a plurality of longitudinally extending straight channels that are parallel to one another and form an entirety of said first coolant flow field on said second stamped plate half.

9. The stamped bipolar plate of claim 7, wherein said first set of coolant feed channels extend at least partially across said second and third coolant flow fields.

10. The stamped bipolar plate of claim 7, wherein said first stamped plate half has a second reactant header region and a fourth coolant flow field, said second reactant header region separating said fourth coolant flow field from said third coolant flow field such that said third and fourth flow fields only communicate with one another through said first set of coolant feed channels.

11. The stamped bipolar plate of claim 10, wherein said first set of coolant feed channels extend at least partially across said second, third and fourth coolant flow fields enabling coolant to flow along said second stamped plate half between said second, third and fourth coolant flow fields through said first coolant flow field.

12. The stamped bipolar plate of claim 10, wherein said first set of coolant feed channels are a plurality of longitudinally extending straight channels that are parallel to one another and form an entirety of said first coolant flow field on said second stamped plate half.

* * * * *